(12) United States Patent
Mizukami et al.

(10) Patent No.: US 11,828,451 B2
(45) Date of Patent: Nov. 28, 2023

(54) ILLUMINATOR APPARATUS

(71) Applicant: Stanley Electric Co., Ltd., Tokyo (JP)

(72) Inventors: Toshinari Mizukami, Tokyo (JP); Yosuke Mizuki, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/795,208

(22) PCT Filed: Jan. 21, 2021

(86) PCT No.: PCT/JP2021/001950
§ 371 (c)(1),
(2) Date: Jul. 25, 2022

(87) PCT Pub. No.: WO2021/153394
PCT Pub. Date: Aug. 5, 2021

(65) Prior Publication Data
US 2023/0100351 A1 Mar. 30, 2023

(30) Foreign Application Priority Data
Jan. 29, 2020 (JP) ................................. 2020-012501

(51) Int. Cl.
*F21V 5/00* (2018.01)
*F21V 5/04* (2006.01)
(Continued)

(52) U.S. Cl.
CPC ............. *F21V 5/008* (2013.01); *F21V 5/045* (2013.01); *F21V 5/007* (2013.01); *F21Y 2105/16* (2016.08); *F21Y 2115/10* (2016.08)

(58) Field of Classification Search
CPC ................................. F21V 5/008; F21V 5/045
See application file for complete search history.

(56) References Cited

U.S. PATENT DOCUMENTS 10,551,034 B1 * 2/2020 Belliveau ................ F21V 13/02
11,253,890 B2 * 2/2022 Horvath ................... B05D 3/067
(Continued)

FOREIGN PATENT DOCUMENTS

JP 2014-022077 A 2/2014
JP 2016-009065 A 1/2016
(Continued)

OTHER PUBLICATIONS

International Search Report and Written Opinion of the International Search Report for PCT/JP2021/001950 dated Mar. 23, 2021.

*Primary Examiner* — Christopher E Dunay
(74) *Attorney, Agent, or Firm* — KENEALY VAIDYA LLP

(57) ABSTRACT

An illuminator apparatus can include: an optical source a collimator lens located on an optical axis of the optical source, for receiving emitted light from the optical source to emit collimated light; and a diffusion lens, located on an emitting surface side of the collimator lens, for receiving the collimated light to diffuse the collimated light. The diffusion lens can be provided with a diffusion section for diffusing central light of the collimated light emitted from a central portion of an emitting surface of the collimator lens and a non-diffusion section for transmitting peripheral light of the collimated light emitted from an outside of the central portion of the emitting surface of the collimator lens, without diffusing the peripheral light.

11 Claims, 11 Drawing Sheets

(51) Int. Cl.
  *F21Y 105/16*  (2016.01)
  *F21Y 115/10*  (2016.01)

(56)  References Cited

U.S. PATENT DOCUMENTS

2012/0230057 A1* 9/2012 Braden .................... F21K 9/23
                                                362/640
2014/0316742 A1* 10/2014 Sun ...................... G02B 17/08
                                                702/167
2022/0034486 A1* 2/2022 Shum .................... F21V 29/83
2022/0120412 A1* 4/2022 Bremerich ............... F21V 7/09
2022/0252238 A1* 8/2022 Yoshida ................. H01L 33/58

FOREIGN PATENT DOCUMENTS

| WO | 2016/186180 A1 | 11/2016 |
| WO | 2017/002725 A1 | 1/2017 |
| WO | 2021/153394 A1 | 8/2021 |

* cited by examiner

Ax

ILLUMINATOR APPARATUS

This application is a U.S. National Stage Application under 35 U.S.C § 371 of International Patent Application No. PCT/JP2021/001950 filed Jan. 21, 2021, which claims the benefit of priority to Japanese Patent Application No. 2020-012501 filed Jan. 29, 2020, the disclosures of all of which are hereby incorporated by reference in their entireties.

TECHNICAL FIELD

The present invention relates to an illuminator apparatus such as a spotlight.

BACKGROUND TECHNOLOGY

Generally, an illuminator apparatus such as a spotlight projects light emitted from an optical source at a narrow angle of light distribution. The projected light is required to have a uniform luminance, a uniform color and distinct brightness and darkness of edges (contours).

FIG. 9 is a cross-sectional view illustrating a first prior art illuminator apparatus.

In FIG. 9, the first prior art illuminator apparatus is constructed by an optical source 1 and a collimator lens 2 (see: Patent Literature 1). The collimator lens 2 is constructed by an incident surface 21 formed by an inner concave surface 211 and an outer convex surface 212, an emitting surface 22 formed by an inner convex surface 221 and an outer conical side surface 222, and a peripheral surface 23 coupling an end of the incident surface 21 to an end of the emitting surface 22. Light incident from the optical source 1 to the inner concave surface 211 of the incident surface 21 is emitted as central collimate light L1 from the inner convex surface 221 of the emitting surface 22. On the other hand, light incident from the optical source 1 to the outer convex surface 212 of the incident surface 21 is totally reflected by the peripheral surface 23, and is emitted as peripheral collimate light L2 from the outer conical side surface 222 of the emitting surface 22. The central collimate light L1 and the peripheral collimate light L2 as projected light are both in parallel with the optical axis Ax, thus realizing a narrow angle light distribution. Note that the central collimate light L1 and the peripheral collimate light L2 are symmetrical with respect to the optical axis Ax.

FIGS. 10A-B illustrate projected light patterns on a virtual screen obtained by the illuminator apparatus of FIG. 9, where (A) shows a case where the optical source 1 has a square light emitting surface with respect to the optical axis Ax of the collimator lens 2, and (B) shows a case where the optical source 1 has a circular light emitting surface with respect to the optical axis Ax of the collimator lens 2.

As illustrated in FIGS. 10A-B, even when the light emitting surface of the optical source 1 is square or circular, the central collimate light L1 and the peripheral collimate light L2 are superposed onto each other, so that edges with distinct brightness/darkness can be obtained.

A second prior art illuminator apparatus diffuses collected light on a primary optical system by a projection lens of a secondary optical system as illustrated in (A) of FIG. 11, to form projected light (see: Patent Literature 2). In this case, the projection lens is a lens array obtained by arranging a large number of hexagonal convex lenses 101 on an incident surface. Referring to (B) of FIG. 11 which shows one of the hexagonal convex lenses 101, parallel light 101a incident perpendicularly to the hexagonal convex lens 101 is diffused along all the directions around 360° with respect to the optical axis Ax and becomes 360°-diffused light 101b. Note that even when the hexagonal convex lenses 101 are arranged on an emitting surface, parallel light incident perpendicularly to the hexagonal convex lenses 101 is diffused along all the directions around 360° with respect to the optical axis Ax. Thus, the shapes of the optical sources are blurred to remove the luminance nonuniformity and mix separated colors to remove the color nonuniformity, thus obtaining a uniform projected light pattern.

PRECEDING TECHNOLOGY LITERATURES

Patent Literature

Patent Literature 1: Japanese Patent Unexamined Publication No. 2014-22077
Patent Literature 2: WO2016-186180

SUMMARY OF THE INVENTION

Problems to be Solved by the Invention

In the first prior art illuminator apparatus as illustrated in FIG. 9, however, the shape of the optical source 1 is projected so as to generate luminance nonuniformity. Also, when light emitted from the optical source 1 such as a white light emitting diode (LED) element has color differences at each emitting point and every emitting angle, color nonuniformity reflecting the color differences of the optical source 1 would be generated. Further, color nonuniformity would be caused by the chromatic aberration of the collimator lens 2. Thus, there is a problem in that the luminance nonuniformity and the color nonuniformity would be generated.

Also, in the second prior art illuminator apparatus as illustrated in FIGS. 11A-B, even in the hexagonal convex lenses arranged in a region corresponding to an edge of the projected light pattern, since these hexagonal convex lenses diffuse the incident light parallel with the optical axis toward all the directions around 360°, the distinct brightness and darkness of the edge would disappear, which is a problem.

Means for Solving the Problems

In order to solve the above-mentioned problems, a illuminator apparatus according to the present invention comprises: an optical source a collimator lens located on an optical axis of the optical source, for receiving emitted light from the optical source to emit collimated light; and a diffusion lens, located on an emitting surface side of the collimator lens, for receiving the collimated light to diffuse the collimated light, and the diffusion lens is provided with a diffusion section for diffusing central light of the collimated light emitted from a central portion of an emitting surface of the collimator lens and a non-diffusion section for transmitting peripheral light of the collimated light emitted from an outside of the central portion of the emitting surface of the collimator lens, without diffusing the peripheral light.

Also, an illuminator apparatus according to the present invention comprises an optical source; a collimator lens, located on an optical axis of the optical source, for receiving emitted light from the optical source to emit collimated light; and a diffusion lens, located on an emitting surface side of the collimator lens, for receiving the collimated light to diffuse the collimated light, and the diffusion lens comprises: a first diffusion section for diffusing central light of the collimated light emitted from a central portion of an emitting surface of the collimator lens; and a second diffusion section for diffusing peripheral light of the collimated light emitted from an outside of the central portion of the emitting surface of the collimator lens, without diffusing the peripheral light, the second diffusion section diffusing the peripheral light only along a rotational direction with respect to the optical axis of the diffusion lens.

Effect of the Invention

According to the present invention, the luminance nonuniformity and the color nonuniformity can be removed, and also, the distinct brightness and darkness of edges can be maintained.

BRIEF DESCRIPTION OF THE DRAWINGS

FIG. 1(A) is an entire cross-sectional view, FIG. 1(B) is a lens array view on the emitting surface side of the diffusion lens of FIG. 1(A), and FIG. 1(C) is a partial enlargement of the diffusion section of FIG. 1(B).

FIG. 2(A) is a lens array view on the emitting surface side and FIG. 2(B) is an enlarged cross-sectional view of the fan-shaped convex lens of FIG. 2(A).

FIG. 3(A) is an entire cross-sectional view, FIG. 3(B) is a lens array view on the emitting surface side of the diffusion lens of FIG. 3(A), and FIG. 3(C) is a light pattern projected by the illuminator apparatus of FIG. 3(A).

FIG. 4(A) is an entire cross-sectional view and FIG. 4(B) is a lens array view on the emitting surface side of the diffusion lens of FIG. 4(A).

FIG. 7(A) and FIG. 7(D) are entire cross-sectional views of collimator lenses, FIG. 7(B) and FIG. 7(E) illustrate collimated light, and FIG. 7(C) and FIG. 7(F) illustrate projected light patterns projected by the collimator lenses.

FIG. 10(A) shows a case wherein the optical source light emitting surface is square, and FIG. 10(B) shows a case wherein the optical source light emitting surface is circular.

FIG. 11(A) shows a lens array view on the emitting surface, and FIG. 11(B) is an enlarged cross-sectional view of the hexagonal convex lens of FIG. 11(A).

EMBODIMENTS

Figure 1A:
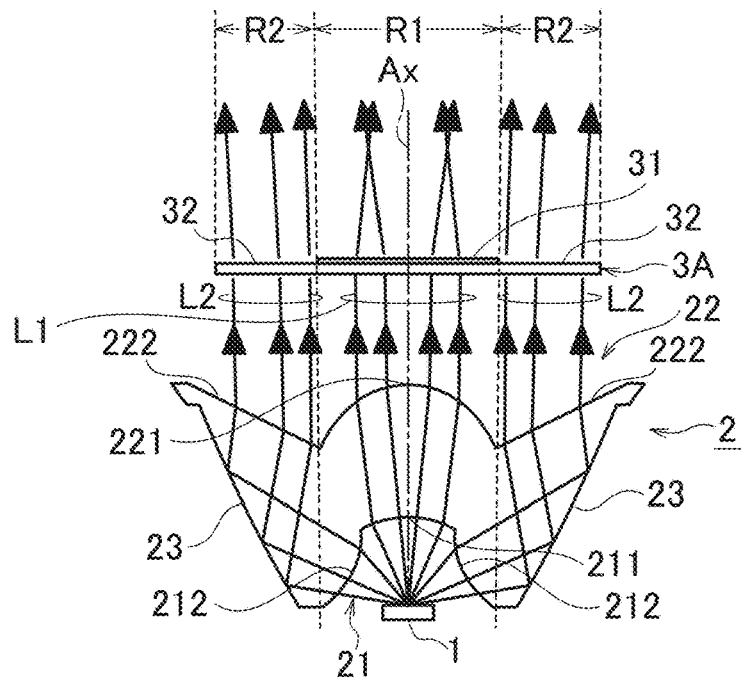
FIGS. 1A-C are views illustrating a first embodiment of the illuminator apparatus according to the present invention, where
Figure 1B:
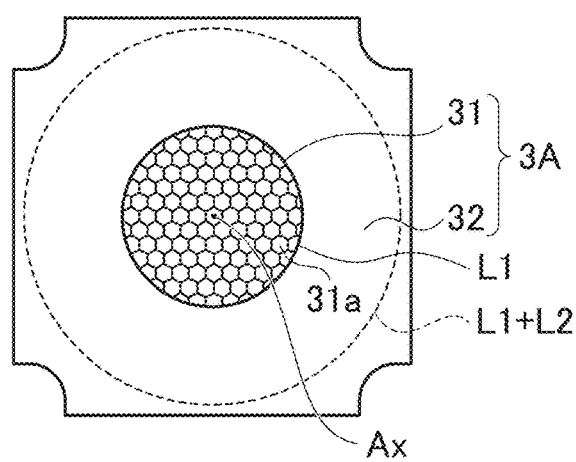
Figure 1C:
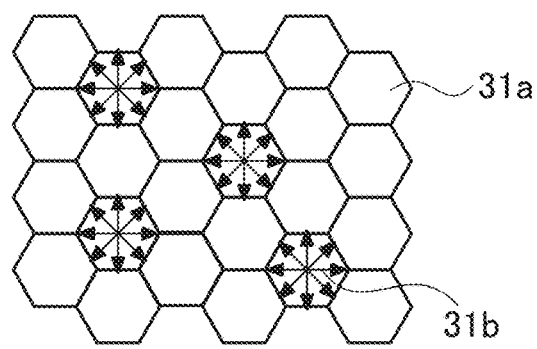

FIGS. 1A-C are views illustrating a first embodiment of the illuminator apparatus according to the present invention, where FIG. 1(A) is an entire cross-sectional view, FIG. 1(B) is a lens array view on the emitting surface side of the diffusion lens of FIG. 1(A), and (C) is a partial enlargement of the diffusion section of FIG. 1(B).

Figure 9:
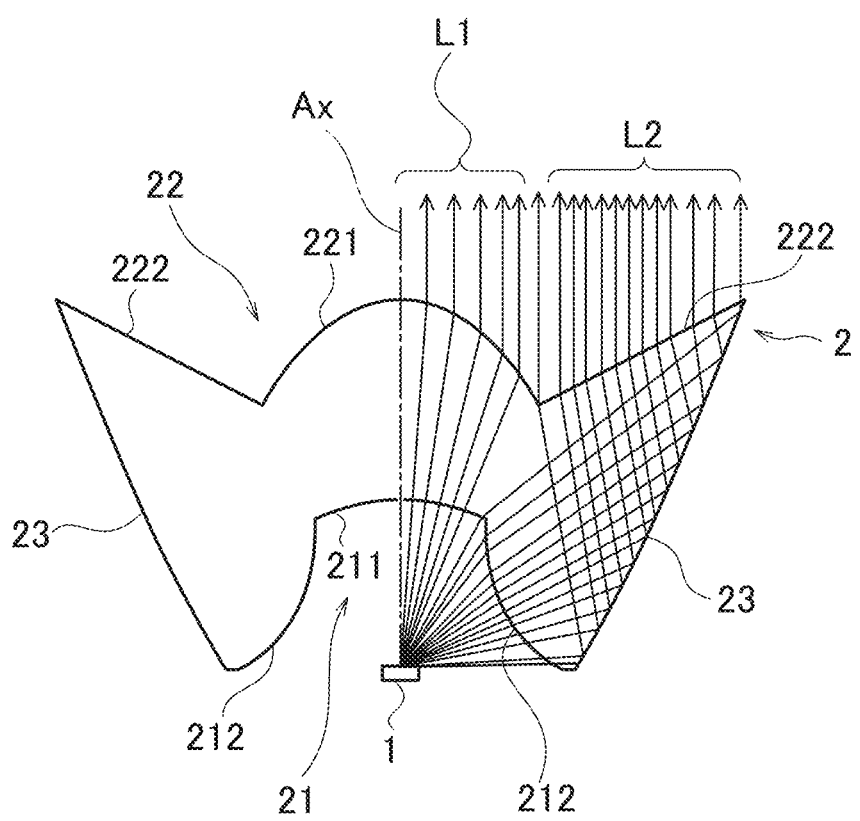
FIG. 9 is a cross-sectional view illustrating a first prior art illuminator apparatus.
Figure 10A:
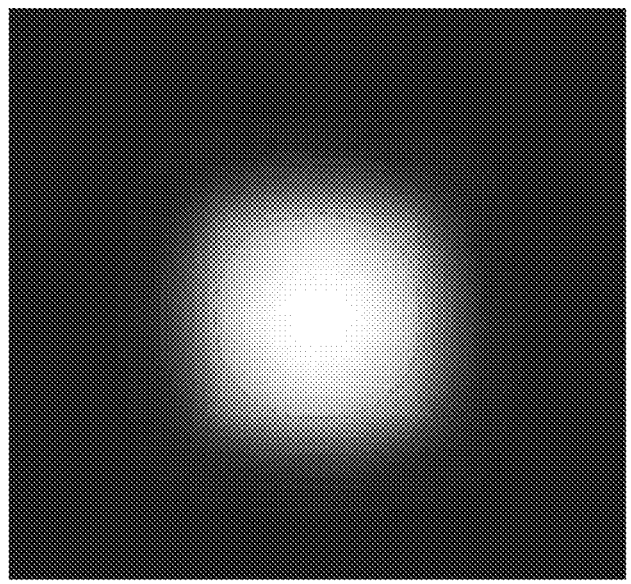
FIGS. 10A-B are projected light patterns by the illuminator apparatus of FIG. 9, where
Figure 10B:
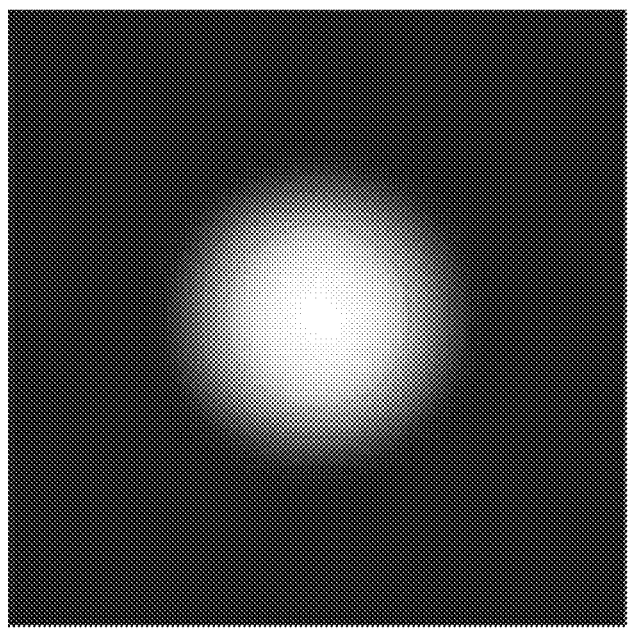
Figure 11A:
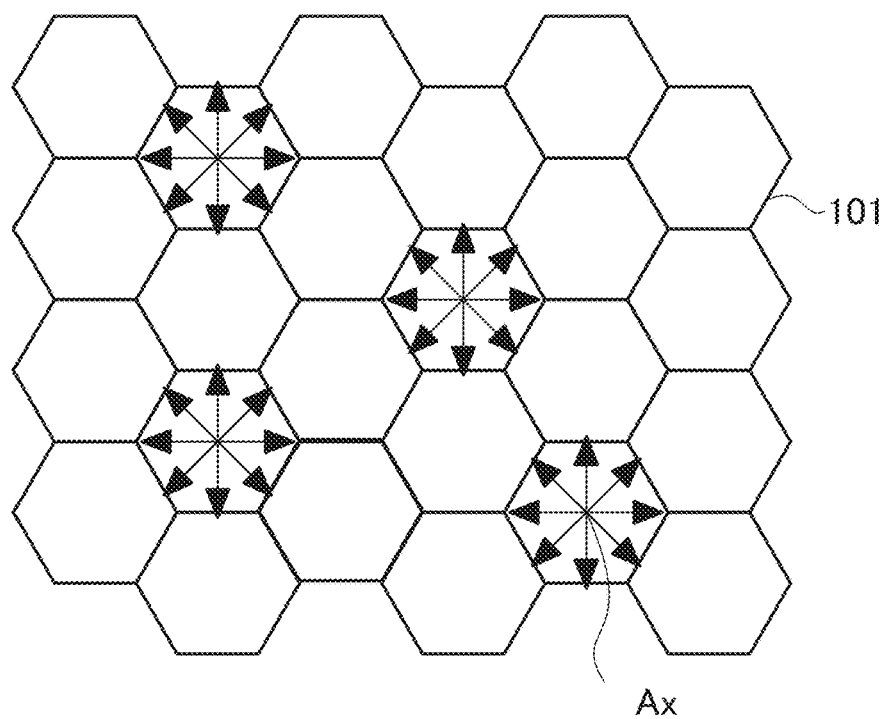
FIGS. 11A-B are views illustrating a second prior art illuminator apparatus, where
Figure 11B:
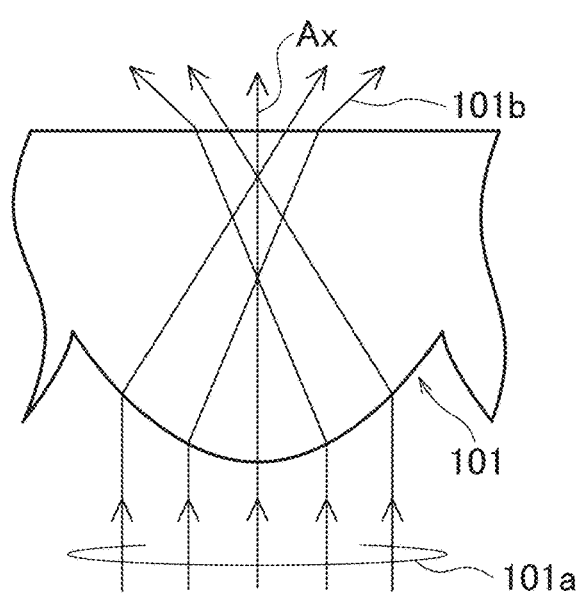

In (A) of FIG. 1, the illuminator apparatus has a diffusion lens 3A on the collimator lens 2, in addition to the optical source such as the light emitting diode (LED) element 1 and the collimator lens 2 provided on the optical source 1 of FIG. 9. Also, referring to (B) of FIG. 1, the diffusion lens 3A has a diffusion section 31 which is circular, for example, on a central section and a non-diffusion section 32 on the periphery of the diffusion section 31. The diffusion section 31 defining a diffusion region R1 has a lens array formed by multiple closest arranged hexagonal convex lenses 31a. Since central collimated light L1 incident parallelly to the optical axis Ax is refracted by the convex surfaces of the hexagonal convex lenses 31a to be transmitted, light passed through the hexagonal convex lenses 31a is diffused along all the directions around 360° to become 360° diffusion light 31b. The diffusion section 31 receives the central collimated light L1 with ununiform luminance and ununiform color to remove the nonuniformity of luminance and the nonuniformity of color. On the other hand, no lens is formed in the non-diffusion section 32 defining a non-diffusion region, so that light incident to the non-diffusion section 32 is transmitted therethrough without diffusing the light. As a result, the non-diffusion section 32 receives the peripheral collimated light (peripheral light) L2 with distinct brightness and darkness of edges and maintains the distinct brightness and darkness. Thus, while the distinct brightness and darkness of edges is maintained, the nonuniformity of luminance and the nonuniformity of color are removed.

In (A) and (B) of FIG. 1, the hexagonal convex lenses 31a are provided on the emitting surface side; however, the hexagonal convex lenses 31a can be provided on the incident surface side while the emitting surface side can be flattened. Also, the diffusion section 31 of the diffusion lens 3 corresponds to the central collimate light L1, and the non-diffusion section 32 of the diffusion lens 3A corresponds to the peripheral collimate light L2; however, the accurate correspondence is not unnecessary. Also, the hexagonal convex lenses 31a have an advantage in that effective use is made of limited space; however, circular convex lenses, rectangular convex lenses and other polygonal convex lenses having a similar diffusion effect can be used.

Figure 2A:
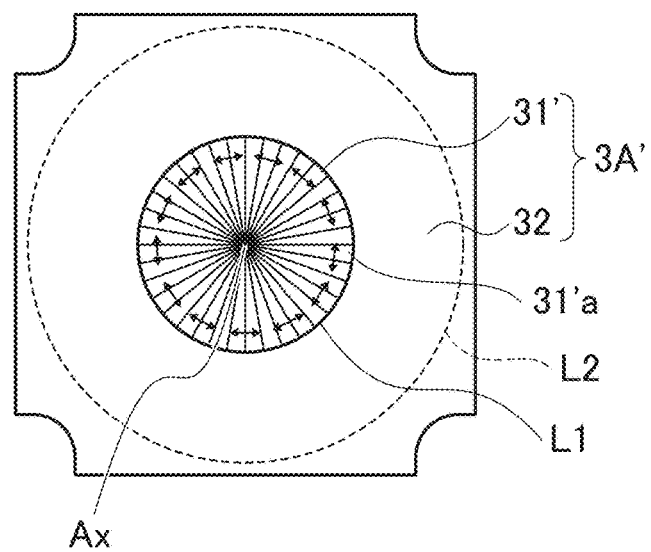
FIGS. 2A-B are views illustrating a modification of the diffusion lens of FIGS. 1A-C, where
Figure 2B:
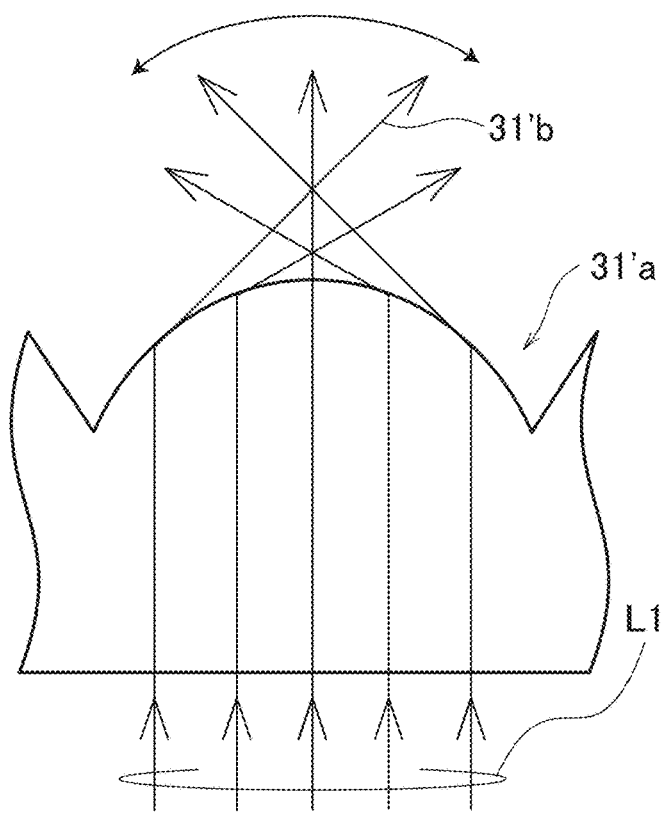

FIGS. 2A-B are views illustrating a modification of the diffusion lens of FIG. 1, where (A) is a lens array view on the emitting surface side and (B) is an enlarged cross-sectional view of the fan-shaped convex lens of (A) cut along its short-side direction (width-side direction) and circumferential direction.

In (A) of FIG. 2, a diffusion section 31' of a diffusion lens 3A' has a lens array formed by multiple radially closest-arranged fan-shaped convex lenses 31'a along its circumferential direction with the optical axis Ax as a center on the emitting surface. Referring to (B) of FIG. 2, since the central collimated light L1 incident parallelly to the optical axis Ax is refracted at the concave surface of the fan-shaped convex lenses 31'a, the central collimated light L1 becomes rotational direction diffusion light 31'b which is diffused only along the rotational direction with respect to the optical axis Ax as indicated by arrows. Therefore, even in this case, the nonuniformity of the luminance and the nonuniformity of the color can be removed. In addition, the light transmitted through the fan-shaped convex lenses 31'a is never diffused outside along the radial direction of the diffusion section 31. Note that, if the fan-shaped convex lenses 31'a are cut along their long-side direction and radial direction, the height of the fan-shaped convex lenses 31'a is gradually decreased to form a right-angled triangle. Also, in FIG. 2, the fan-shaped convex lenses 31'a can be provided on the incident surface of the diffusion lens 3A', and the emitting surface can be flattened.

Figure 3A:
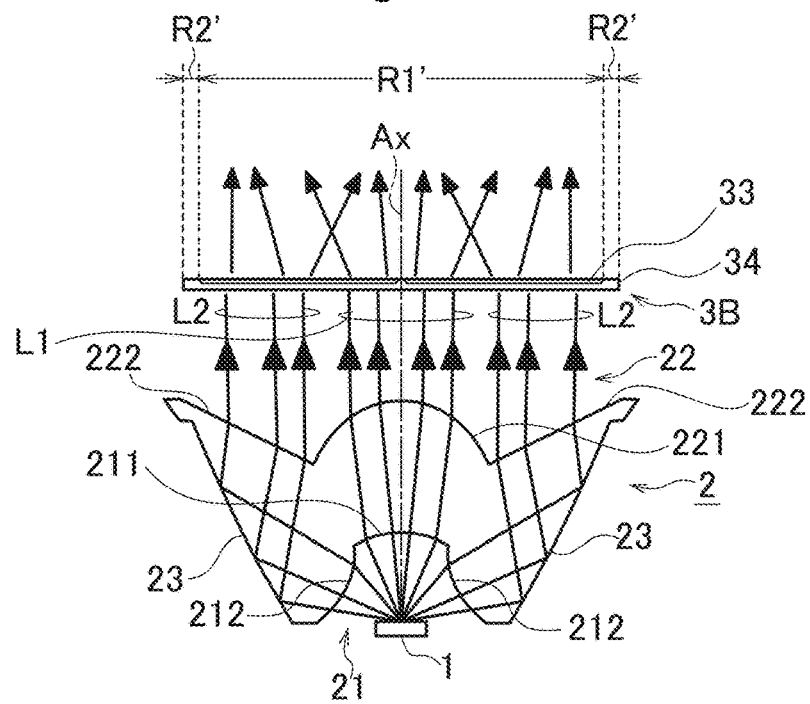
FIGS. 3A-C are views illustrating a second embodiment of the illuminator apparatus according to the present invention, where
Figure 3B:
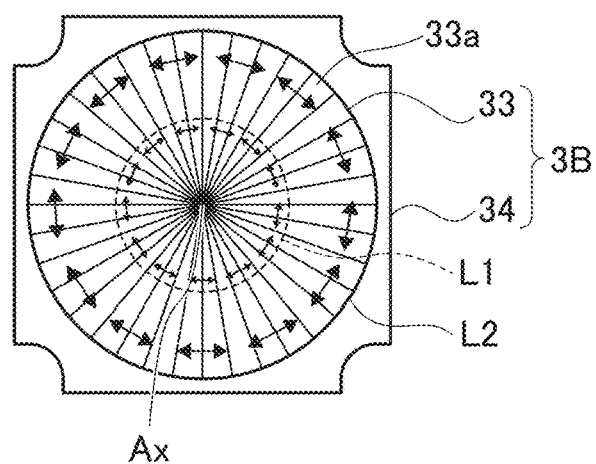
Figure 3C:
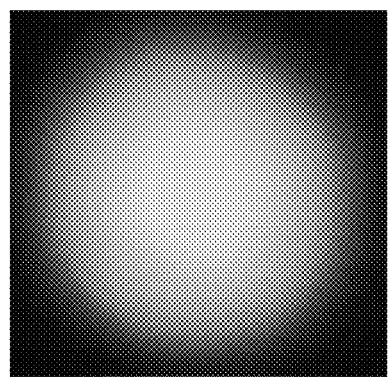

FIGS. 3A-C are views illustrating a second embodiment of the illuminator apparatus according to the present invention, where (A) is an entire cross-sectional view, (B) is a lens array view on the emitting surface side of the diffusion lens of (A), and (C) is a light pattern projected by the illuminator apparatus of (A).

In (A) of FIG. 3, a diffusion lens 3B is provided instead of the diffusion lens 3A of (A) of FIG. 1. Also, referring to (B) of FIG. 3, the diffusion lens 3B has a diffusion section 33 and a non-diffusion section 34 on the periphery of the diffusion section 33. The diffusion section 33 defining a diffusion region R1' has a lens array formed by multiple radially closest-arranged fan-shaped convex lenses 33a along its circumferential direction with the optical axis Ax as a center. In the same way as in (B) of FIG. 2, the central collimated light L1 and the peripheral collimated light L2 incident parallelly to the optical axis Ax are refracted by the convex surface of the fan-shaped convex lenses 33a and are diffused only along the rational direction with respect to the optical axis as indicated by arrows in (B) of FIG. 3. On the other hand, no lens is formed in the non-diffusion section 34 defining a non-diffusion region R2', so that light incident to the non-diffusion section 34 is transmitted therethrough without diffusing the light.

The diffusion section 33 receives both of the central collimated light L1 and the peripheral collimated light L2. The central collimated light L1 incident to the diffusion section 33 is diffused only along the rotational direction with respect to the optical axis Ax, so that the nonuniformity of luminance and the nonuniformity of color are removed. Similarly, the peripheral collimated light L2 incident to the diffusion section 33 is diffused only along the rotational direction with respect to the optical axis Ax, so that the edges are not expanded, the distinct brightness and darkness of the edges are maintained. Thus, as illustrated in (C) of FIG. 3, in the projected light pattern, while the distinct brightness and darkness of the edges are maintained, the nonuniformity of luminance and the nonuniformity of color are removed. Even in FIGS. 3A-C, the fan-shaped convex lenses 33a can be on the incident surface side of the diffusion lens 3B.

Figure 4A:
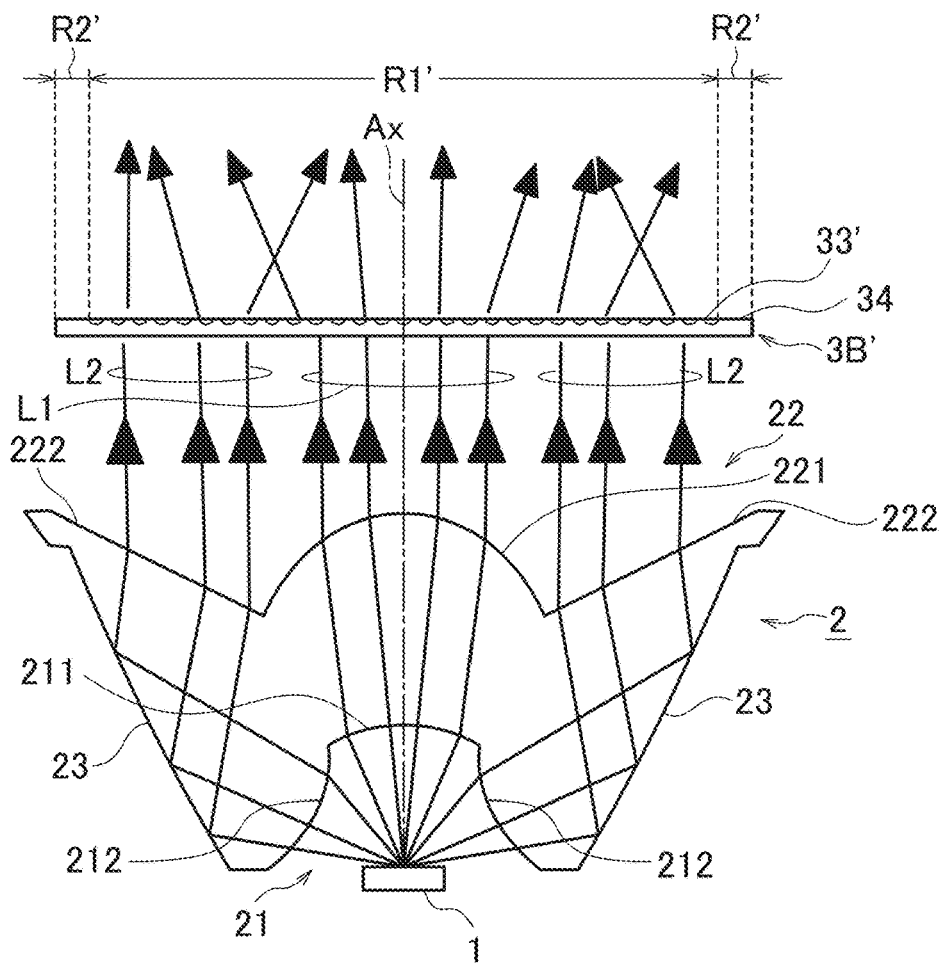
FIGS. 4A-B are views illustrating a comparative example with the illuminator apparatus of FIGS. 3A-C, where
Figure 4B:
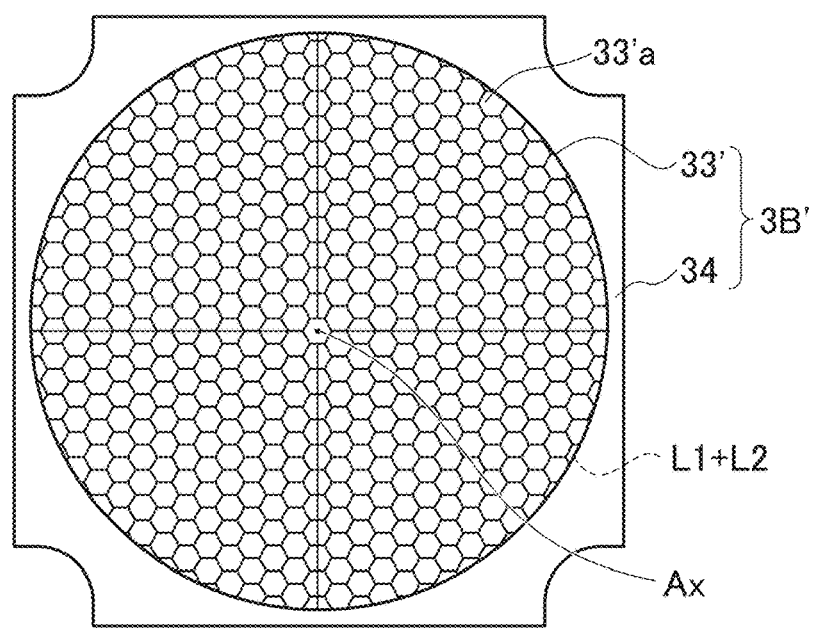
Figure 5:
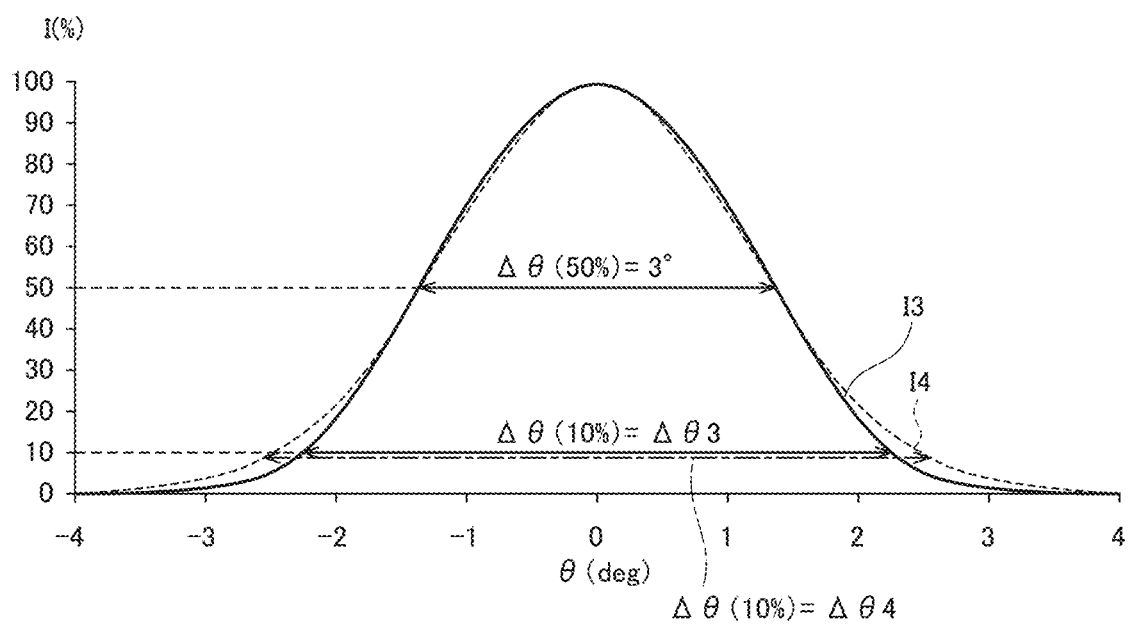
FIG. 5 is a graph illustrating the normalized luminous intensity characteristics of the illuminator apparatuses of FIGS. 3A-C and 4A-B.

In FIGS. 4A-B, which illustrates a comparative example with the illuminator apparatus of FIGS. 3A-C, a diffusion lens 3B' is provided instead of the diffusion lens 3B of FIG. 3. The diffusion lens 3B' has a diffusion section 33' and a non-diffusion section 34. The diffusion section 33' defining a diffusion region is a lens array where a large number of hexagonal convex lenses 33'a are arranged. The diffusion section 33' receives both of the central collimated light L1 and the peripheral collimated light L2. In this case, the nonuniformity of luminance and the nonuniformity of color of the central collimated light L1 and the peripheral collimated light L2 are removed. However, the distinct brightness and darkness of the edges of the peripheral collimated light L2 are blurred by the diffusion at all the directions around 360° caused by the hexagonal convex lenses 33'a of the diffusion section 33 close to the edges. That is, as illustrated in FIG. 5, which shows the normalized luminous intensity characteristic with respect to the emitting angle θ, the fan-shaped convex lenses 33a of FIGS. 3A-C and the hexagonal convex lenses 33'a are designed so that the half-beam angle is 3°, the half-width Δθ 50%) of the normalized luminous intensity I3 of the fan-shaped convex lenses 33a of FIGS. 3A-C and the half-width Δθ (50%) of the normalized luminous intensity I4 of the hexagonal convex lenses 33'a of FIGS. 4A-B are both 3°. However, regarding the beam angle Δθ (10%) at 10%, the half-width Δθ (10%) of the normalized luminous intensity I3 of the fan-shaped convex lenses 33a is smaller than the half-width Δθ (50%) of the normalized luminous intensity I4 of the hexagonal convex lenses 33'a, it can be understood that the brightness and darkness of edges is more distinct in the diffusion lens 3B using the fan-shaped convex lenses 33a than in the diffusion lens 3B' using the hexagonal convex lenses 33'a.

In the diffusion section 33 of FIGS. 3A-C, the farther the location of the fan-shaped convex lenses 33a from the optical axis Ax, the larger the width of the fan-shaped convex lenses 33a. Therefore, the farther the location of the fan-shaped convex lenses 33a, the larger the curvature of the fan-shaped convex lenses 33a at that location, so that the diffusion effect of light becomes smaller.

Figure 6A:
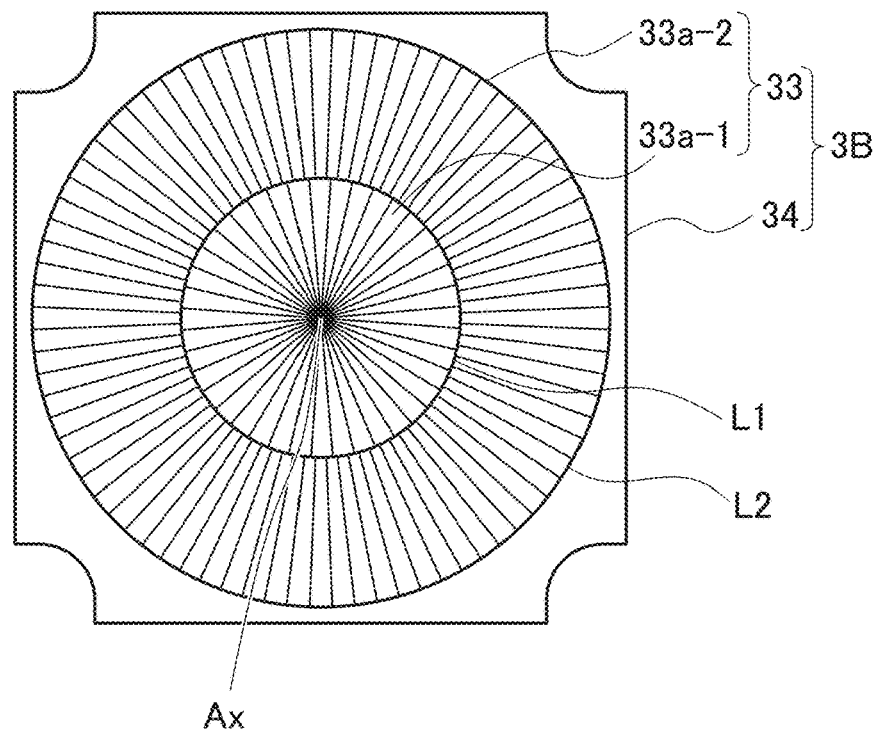
FIGS. 6A-B each depict lens array views on the emitting surface side of a modifications of the diffusion lens of FIGS. 3A-C.
Figure 6B:
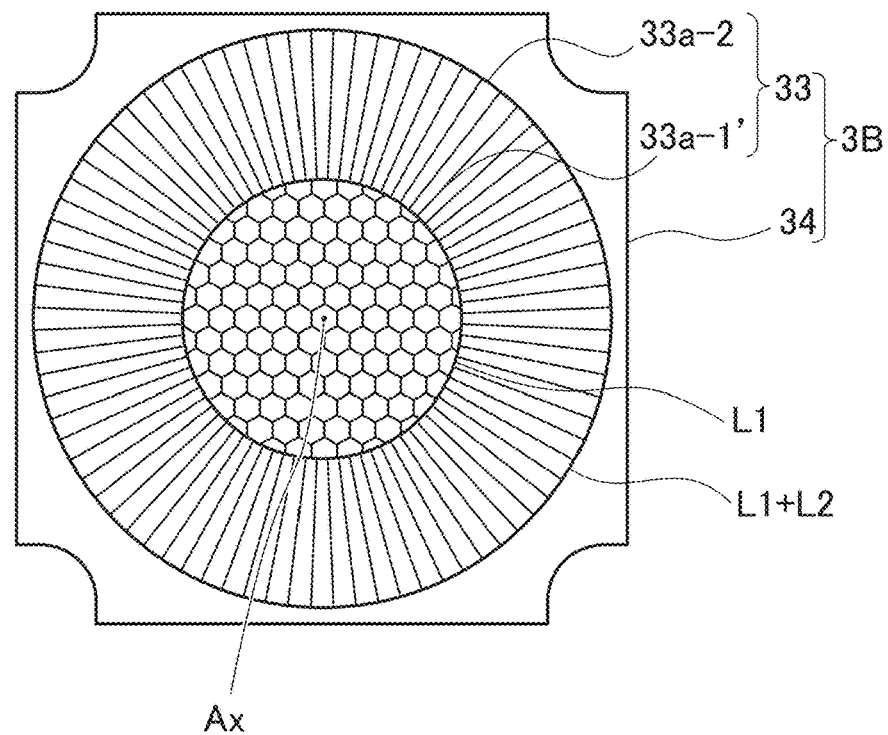
Figure 7A:
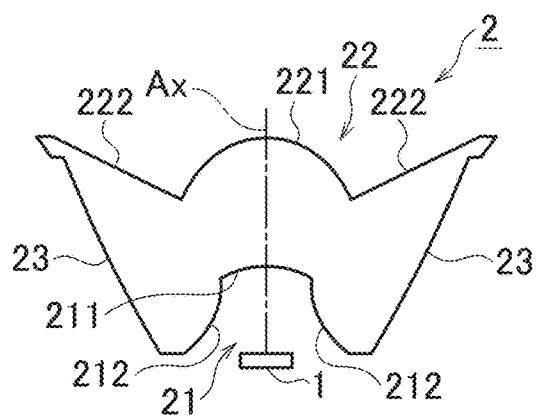
FIGS. 7A-F are views explaining collimated light patterns of the collimator lenses of FIGS. 1A-C and 3A-C, where
Figure 7D:
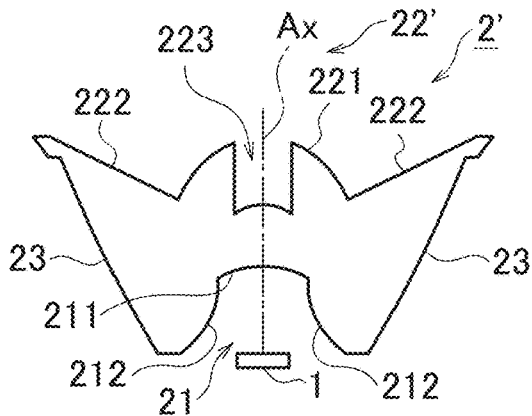
Figure 7B:
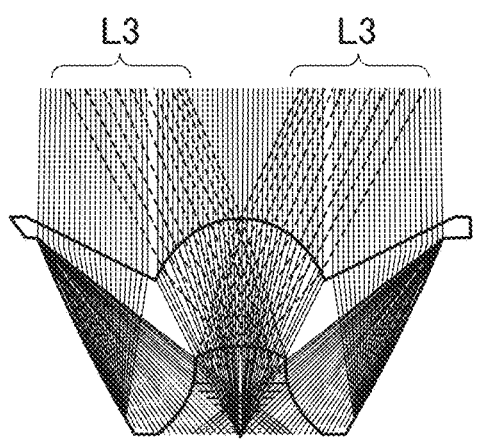
Figure 7E:
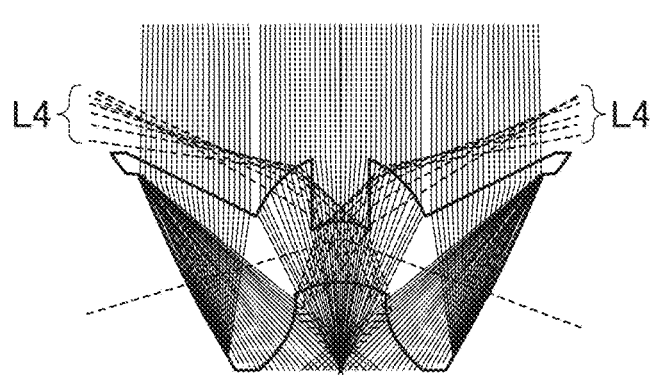
Figure 7C:
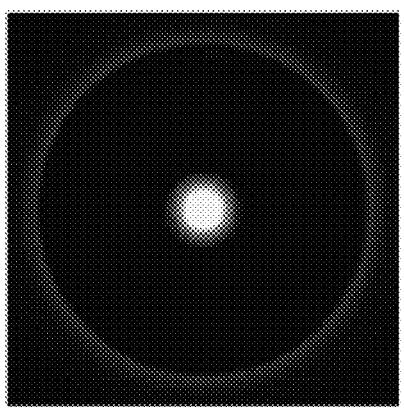
Figure 7F:
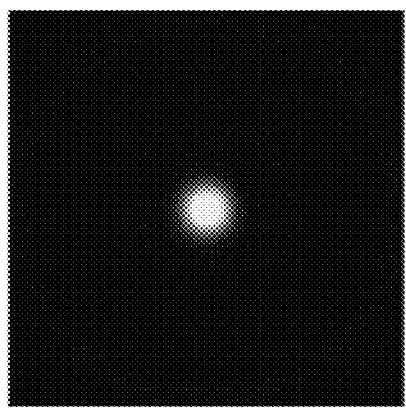

FIGS. 6A-B are lens array views on the emitting surface side of a modifications of the diffusion lens of FIGS. 3A-C.

In (A) of FIG. 6, inner fan-shaped convex lenses 33a-1 and outer fan-shaped convex lenses 33a-2 are provided instead of the fan-shaped convex lenses 33a of the diffusion section 33 of FIGS. 3A-C. In this case, the number of the outer fan-shaped convex lens 33a-2 is larger than the number of the inner fan-shaped convex lens 33a-1. In other words, the width of the fan-shaped convex lens 33a-2 is smaller than the width of the fan-shaped convex lenses 33a of FIGS. 3A-C. Thus, the curvature of the fan-shaped convex lenses 33a-2 is smaller than the curvature of the fan-shaped convex lenses 33a of FIGS. 3A-C, so that the diffusion effect of light can be enhanced, which is helpful in removing the luminance nonuniformity and the color nonuniformity. Note that the two kinds of the inner fan-shaped convex lenses 33a-1 and 33a-2 are provided; however, three kinds of fan-shaped convex lenses can be provided. Even in this case, the number of outer fan-shaped convex lenses is larger than the number of inner fan-shaped convex lenses to enhance the diffusion effect of light.

In (B) of FIG. 6, hexagonal convex lenses 33a-1' are provided instead of the fan-shaped convex lenses 33a-1 of (A) of FIG. 6. Thus, the light diffusion effect in the central portion of the diffusion section 33 can be enhanced, and the effect of removing the nonuniformity of luminance and the nonuniformity of color can be further enhanced. Note that circular convex lenses or other polygonal convex lenses can be provided instead of the hexagonal convex lenses 33a-1'.

FIGS. 7A-F are views for explaining the collimated light of the collimator lenses of FIGS. 1A-C and 3A-C.

As illustrated in (A) of FIG. 7, the collimator lens 2 in FIGS. 1A-C and 3A-C is the same as the collimator lens of FIG. 9. As a result, as illustrated in (B) of FIG. 7, light emitted from the optical source 1 is incident to the inner concave surface 211 of the incident surface 21, and is emitted through the inner convex surface 221 of the emitting surface 22, so that non-parallel leakage light L3 is generated almost above the emitting surface 22. Therefore, when the collimated light of the collimator lens 2 is projected, ring-shaped noise light may be generated around the projected light pattern as illustrated in (C) of FIG. 9.

Contrary to this, in a collimator lens 2' formed as illustrated in (D) of FIG. 7, a recess portion 223 is provided in the inner convex surface 221 of an emitting surface 22'. In this case, as illustrated in (E) of FIG. 7, incident light from the inner concave surface 211 becomes leakage light L4 which is leaked from the concave portion 223 via the inner convex surface 221 right beside the emitting surface 22 of the collimator lens 2'. As a result, Therefore, when the collimated light of the collimator lens 2' is projected, no ring-shaped noise light is generated around the projected light pattern as illustrated in (F) of FIG. 7.

Figure 8:
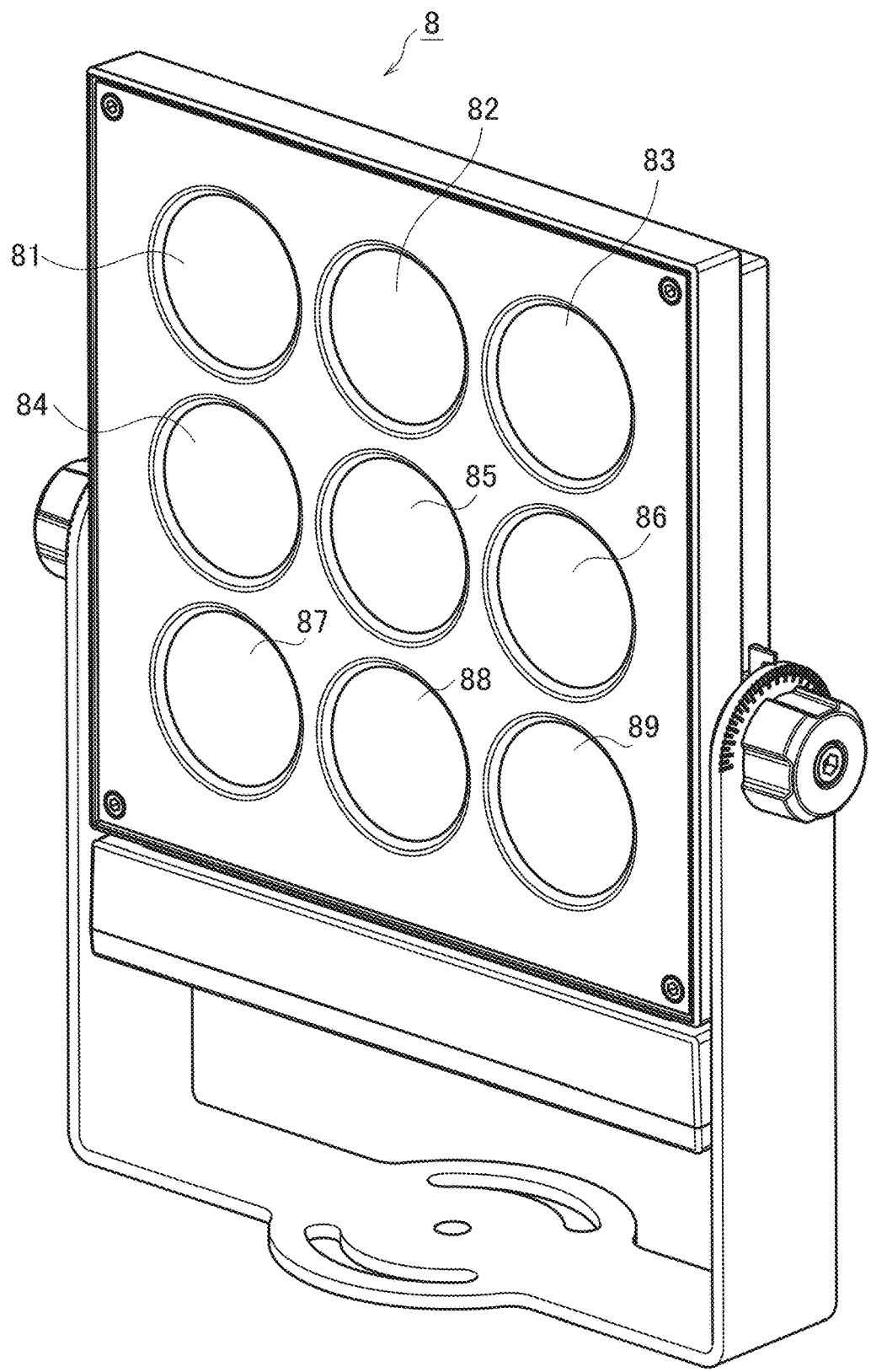
FIG. 8 is a front view illustrating a spotlight apparatus to which the illuminator apparatuses of FIGS. 1A-C and 3A-C are applied.

FIG. 8 is a perspective view illustrating a spotlight apparatus using illuminator apparatuses 81, 82, ..., 89 according to the present invention.

As illustrated in FIG. 8, each of the illuminator apparatuses 81, 82, ..., 89 are adapted to emit light approximately along the same direction, so that spot light of the spotlight apparatus reaches about 1 km. In this case, each of the illuminator apparatuses 81, 82, ..., 89 is constructed by the illuminator apparatus of FIG. 1A-C, 2A-B, 3A-C or 6, where the collimator lenses 2 (2') can be the same as each other and the diffusion lenses can be different from each other.

Note that the present invention can be applied to any alterations within the obvious scope of the above-mentioned embodiments.

UTILIZATION IN INDUSTRY

The illuminator apparatus according to the present invention can be utilized in a projector, a searchlight apparatus, a scenery illuminator apparatus, a wall illuminator apparatus and the like, in addition to a spotlight apparatus.

DESCRIPTION OF THE SYMBOLS

1: light source
2, 2': collimator lens
21: incident surface
211: inner concave surface
212: outer convex surface
22, 22': emitting surface
221: inner convex surface
222: outer conical side surface
223: recess portion
101: hexagonal convex lens
3A, 3B, 3B': diffusion lens
31, 31': diffusion section
31a: hexagonal convex lens
31'a: fan-shaped convex lens
32: non-diffusion section
33, 33': diffusion section
33a, 33a-1, 33a-2: fan-shaped convex lens
33a-1': fan-shaped convex lens
34: non-diffusion section
8: spotlight apparatus
81, 82, ..., 89: illuminator apparatus
L1: central collimated light (central light)
L2: peripheral collimated light (peripheral light)
$A_x$: optical axis
R1, R1': diffusion region
R2, R2': non-diffusion region

The invention claimed is:

1. An illuminator apparatus comprising:
an optical source;
a collimator lens, located on an optical axis of said optical source, for receiving emitted light from said optical source to emit collimated light; and
a diffusion lens, located on an emitting surface side of said collimator lens, for receiving said collimated light to diffuse said collimated light,
said collimator lens comprising:
a first incident surface having an inner concave surface located at a central portion of said first incident surface and an outer convex surface outside of said inner concave surface;
a first emitting surface opposite to said first incident surface having an inner convex surface located at a central portion of said first emitting surface and an outer conical side surface outside of said inner convex surface; and
a peripheral surface coupling an end of said first incident surface to an end of said first emitting surface,
said diffusion lens comprising:
a second incident surface apart from said first emitting surface and opposing said first emitting surface;
a second emitting surface opposite to said second incident surface;
a diffusion section for diffusing central light of said collimated light emitted from said central portion of said first emitting surface of said collimator lens; and
a non-diffusion section for transmitting peripheral light of said collimated light emitted from an outside of said central portion of said first emitting surface of said collimator lens,
said diffusion section having multiple lenses on a side of said second incident surface or said second emitting surface.

2. The illuminator apparatus as set forth in claim 1, wherein said multiple lenses comprise an array of multiple circular or polygonal convex lenses.

3. The illuminator apparatus as set forth in claim 1, wherein said multiple lenses comprise an array of multiple fan-shaped convex lenses centered at the optical axis of said diffusion lens radially arranged along a circumferential direction of said optical axis.

4. The illuminator apparatus as set forth in claim 3, wherein said optical source has a plane light emitting surface on the optical axis of said collimator lens.

5. The illuminator apparatus as set forth in claim 1, wherein a recess portion is provided at a center of said inner convex surface of said first emitting surface.

6. The illuminator apparatus as set forth in claim 1, wherein said optical source comprises a light emitting diode element.

7. The illuminator apparatus as set forth in claim 1, comprising a spotlight apparatus.

8. The illuminator apparatus as set forth in claim 1, comprising a projector.

9. The illuminator apparatus as set forth in claim 1, comprising a searchlight apparatus.

10. The illuminator apparatus as set forth in claim 1, comprising a scenery illuminator apparatus.

11. The illuminator apparatus as set forth in claim 1, comprising a wall illuminator apparatus.

* * * * *